United States Patent
Ghodsnia et al.

(10) Patent No.: US 9,442,858 B2
(45) Date of Patent: Sep. 13, 2016

(54) SOLID STATE DRIVES AS A PERSISTENT CACHE FOR DATABASE SYSTEMS

(75) Inventors: Pedram Ghodsnia, Waterloo (CA); Reza Sherkat, Waterloo (CA); John C. Smirnios, Waterloo (CA); Peter Bumbulis, Cambridge (CA); Anil K. Goel, Waterloo (CA)

(73) Assignee: IANYWHERE SOLUTIONS, INC., Dublin, CA (US)

( * ) Notice: Subject to any disclaimer, the term of this patent is extended or adjusted under 35 U.S.C. 154(b) by 727 days.

(21) Appl. No.: 13/548,704

(22) Filed: Jul. 13, 2012

(65) Prior Publication Data
US 2014/0019688 A1    Jan. 16, 2014

(51) Int. Cl.
G06F 12/00 (2006.01)
G06F 12/08 (2016.01)

(52) U.S. Cl.
CPC ....... *G06F 12/0866* (2013.01); *G06F 12/0897* (2013.01); *G06F 2212/225* (2013.01)

(58) Field of Classification Search
CPC .......... G06F 12/0866; G06F 12/0868; G06F 12/0871; G06F 12/0873
See application file for complete search history.

(56) References Cited

U.S. PATENT DOCUMENTS

| | | | |
|---|---|---|---|
| 7,434,007 B2 | 10/2008 | Evrard et al. | |
| 8,321,645 B2 | 11/2012 | Rabii et al. | |
| 8,516,186 B2 | 8/2013 | Fukui et al. | |
| 2007/0288721 A1* | 12/2007 | Kruger et al. | 711/207 |
| 2010/0318727 A1* | 12/2010 | Lee et al. | 711/103 |
| 2010/0318734 A1 | 12/2010 | Vaid et al. | |
| 2011/0066808 A1 | 3/2011 | Flynn et al. | |

OTHER PUBLICATIONS

Notification of Transmittal of the Interantional Search Report and the Written Opinion of the International Searching Authority, or the Declaration, mailed Oct. 22, 2013, 14 pages.

* cited by examiner

*Primary Examiner* — Brian Peugh
(74) *Attorney, Agent, or Firm* — Sterne, Kessler, Goldstein & Fox P.L.L.C.

(57) ABSTRACT

Disclosed herein are systems, methods, and computer readable storage media for a database system using solid state drives as a second level cache. A database system includes random access memory configured to operate as a first level cache, solid state disk drives configured to operate as a persistent second level cache, and hard disk drives configured to operate as disk storage. The database system also includes a cache manager configured to receive a request for a data page and determine whether the data page is in cache or disk storage. If the data page is on disk, or in the second level cache, it is copied to the first level cache. If copying the data page results in an eviction, the evicted data page is copied to the second level cache. At checkpoint, dirty pages stored in the second level cache are flushed in place in the second level cache.

19 Claims, 6 Drawing Sheets

SOLID STATE DRIVES AS A PERSISTENT CACHE FOR DATABASE SYSTEMS

BACKGROUND

1. Field

The invention relates generally to database caches.

2. Background

Nearly all commercial database systems rely on caching techniques to improve performance. Caches are often implemented in memory that can be accessed quickly, such as random access memory (RAM), as opposed to storage that takes longer to access, such as disk-based storage. Caches typically store frequently used data and reduce the time needed by a database system to access a data page. RAM, however, is much more costly than disk-based storage.

BRIEF SUMMARY

Embodiments disclosed herein include systems, methods and computer-readable media for using solid state drives as persistent caches for database systems. A database system includes one or more random access memories configured to operate as a first level cache for the database system. The database system also includes one or more solid state drives configured to operate as a persistent second level cache for the database system. The database system includes one or more hard disk drives configured to operate as disk storage for the database system. The database system further includes a cache manager implemented on one or more processors. The cache manager is configured to receive a request for a data page, and determine whether the requested data page is stored in the first level cache, second level cache, or disk storage. If the requested data page does not exist in the first or second level cache, the requested data page is copied from the disk storage to the first level cache. If copying the requested data page to the first level cache results in eviction of a data page stored in the first level cache, the cache manager is configured to copy a first level cache victim data page from the first level cache to the second level cache. During checkpoint time, dirty memory pages stored in the second level cache are flushed into the second level cache. Dirty memory pages not stored in the second level cache are flushed into disk storage.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, farther serve to explain the principles of the invention and to enable a person skilled in the relevant art to make and use the invention.

Figure 1:
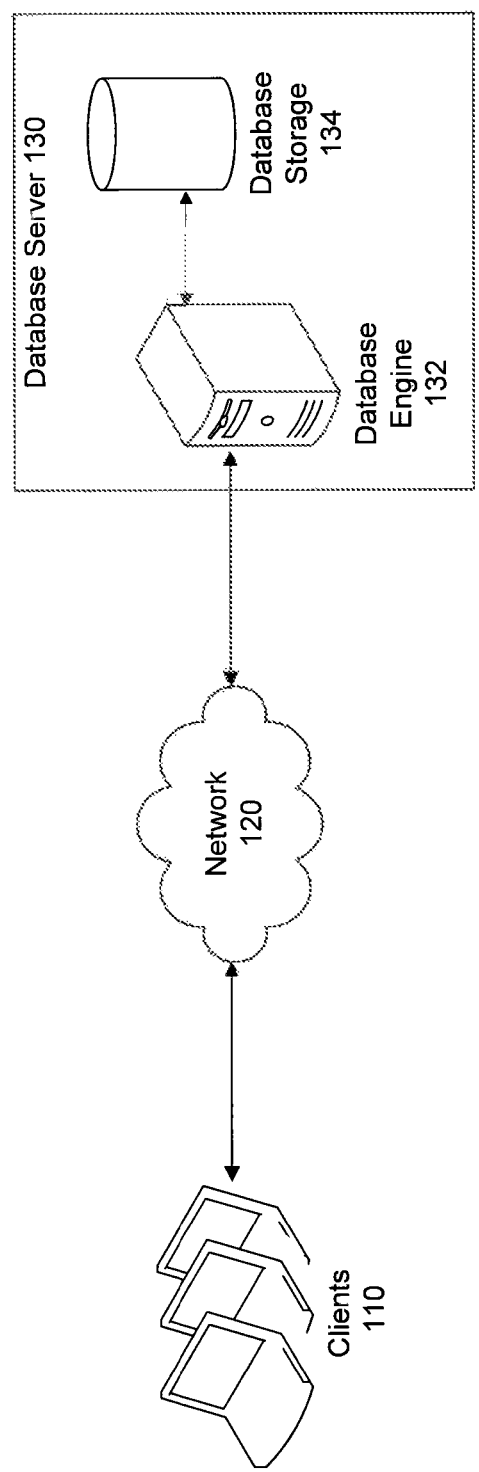
FIG. 1 is a diagram of an exemplary database system.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Databases commonly organize data in the form of tables. Each table generally has a number of rows and columns, and each row in a table generally has a data value associated with each of the columns. This intersection of rows and columns is commonly referred to as a cell. A system needing access to data in the database typically issues a request in the form of a query. A query usually involves a request for the data contained in one or more cells of any rows that meet a particular condition. This condition often involves the comparison of the values of cells in a column to some other value to determine whether the row associated with the compared cell meets the condition. The query can also modify data contained in one or more cells of any rows that meet a particular condition.

FIG. 1 is a diagram of an exemplary database system. Database system 100 includes one or more clients 110, a network 120, and a database server 130. The database server 130 includes a database engine 132 and database storage 134.

Clients 110 are operable to send requests for data, commonly in the form of a database queries, to database server 130 over network 120. Database server 130 replies to each request by sending a set of results, commonly in the form of result rows from a database table, to clients 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Clients 110 can each be any type of computing device having one or more processors, a user input (for example, a mouse, QWERTY keyboard, touch-screen, microphone, or a T9 keyboard), and a communications infrastructure capable of receiving and transmitting data over a network. For example, clients 110 can include, but are not limited to, a mobile phone, a personal digital assistant (PDA), a computer, a cluster of computers, a set-top box, or other similar type of device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of database system 100 depending upon a particular application or environment.

When a request for data, such as a query, is received by database server 130, it is handled by database engine 132. Database engine 132 is operable to determine the data requested by the query, obtain the data, and provide a reply to the query. One skilled in the relevant art given this description will appreciate that while database engine 132 is illustrated as a single module in database system 100, database engine 132 may be implemented in a number of ways in order to accomplish the same function. Accordingly, the illustration of modules in database server 130 is not a limitation on the implementation of database server 130.

Database engine 132 is operable to obtain the data in response to the query from database storage 134. Database storage 134 stores values of a database in a data structure. Typically, database values are stored in a table data structure, the table having data rows and columns. At the intersection of each row and column is a data cell, the data cell having access to a data value corresponding to the associated row and column. Each column normally has an associated data type, such as "string" or "integer," which is used by database engine 132 and clients 110 to interpret data contained in a data cell corresponding to the column. The database often comprises multiple tables. Database data is typically stored in the database storage 134 across multiple pages. Pages can vary in size.

Additionally, database storage 134 comprises alternate means of indexing data stored in a table of a database. Database engine 132 is operable to analyze a query to determine whether an available alternate means is useful to better access the data stored in a table, and then utilizes this alternate means to obtain data from the table.

Further, database storage 134 may be implemented as a relational database and database engine 132 may be implemented using a relational database management system (RDBMS). A person skilled in the relevant art given this description would appreciate that embodiments may be operable to work with any RDBMS.

As mentioned above, database systems rely on caching techniques to improve performance. Most database systems store data on one or more hard disk drives, typically in a disk array. Such disk arrays typically have a very low cost per unit of storage (such as cost per gigabyte or GB). Hard disk drives are very reliable as well, but access to data on hard disk drives is very slow. Hard disk drives may also be referred to as persistent storage, as data on a hard disk drive is not lost upon system shutdown.

To reduce the time needed to access database data, most database systems employ random access memory (RAM) as a cache to store a subset of data pages in a database. RAM has a very high access speed, but the cost per unit of storage is also very high. Thus, the cache can only store a limited amount of data. Moreover, RAM is volatile storage; that is, if the database system loses power (either intentionally or unintentionally), the data stored on the RAM is lost.

Depending on the cache technique used, the cache stores recently requested data or frequently requested data pages. When a query is received by a database system from a client, a data page containing data requested by the query is identified, and the database system (or a cache manager implemented as part of the database system) determines whether the data page is stored in the cache, or on disk. If the data page is stored in cache, it can be provided quickly to the requesting client. Otherwise, the data page is provided from disk storage. In some caching techniques, the data page provided from disk is also copied to cache to speed up subsequent accesses of the data page. Thus, subsequent reads and writes of the data page occur using the cache.

Periodically, dirty pages stored in a cache are copied from the cache to disk. Dirty pages refer to data pages which have been modified by a query, but have not yet been written to disk. The process of copying dirty pages to disk is known as a checkpoint. Unmodified pages are referred to as "clean" pages.

As mentioned above, the cost per unit of storage of RAM is much higher than the cost per unit of storage of hard disk drives. Thus, the size of a cache in a database system is much smaller than the size of disk storage. For example, a database system may have 8 GB of RAM that can be used as cache, while the disk storage of the database is 500 GB or more. Thus, only a very small subset of data can be stored in cache. Sometimes, a database system will try to copy a data page from disk to cache when the cache is full. In such a situation, the database system must evict a "victim" data page currently stored in the cache back to disk, and then admit and copy the data page from disk.

Solid state drives (SSDs) can also be used as cache for database systems. Solid state drives are between hard disk drives and RAM, in terms of both storage cost per unit and access time. That is, they are more expensive than traditional hard disk drive storage, but less expensive than RAM. Solid state drives also have lower power usage than traditional disk storage, are space efficient, largely silent, produce lower heat, and have near-instant start up times. Many solid state drives are resistant to extreme shock, vibration, temperature, and altitude.

The disadvantages of solid state drives have recently been addressed as well. For example, the random write performance of solid state drives has been increasing. Cost per unit of storage of solid state drives has also been decreasing. Further, the durability of solid state drives has increased recently.

Some database systems utilize solid state drives as a second level of cache. In one such system, only clean (or unmodified) data pages can be cached in an SSD, while dirty pages are written back to disk. In another such system, dirty pages are cached on the SSD and simultaneously copied to disk. Many of these techniques require periodic copying of data stored on the SSD to the hard disk drive at checkpoint, and do not fully utilize the performance gains possible with SSDs.

Recent advances in SSD technology have resulted in more reliable devices. While previous techniques utilized SSDs as a second level cache, such techniques inherently assumed the SSD devices were unreliable, and thus periodically copied data stored on the SSD to disk to ensure recovery can take place. This periodic copying of data from the SSD to the disk storage reduces database system performance significantly. Additionally, some of these systems do not employ direct memory access between the SSD and the disk storage. Thus, to clean a page, data must be copied from the SSD to RAM, and then to the disk storage, which is a very expensive operation. Additionally, upon system crash or shutdown and subsequent restart, the SSD contains no data, and thus performance increases take some time to realize. Moreover, the recovery process cannot take advantage of the existing data in the SSD to reduce the recovery time.

Embodiments disclosed herein utilize one or more solid state drives as a persistent second level cache. Accordingly, performance gains of solid state drives can be realized after a system crash or shutdown (i.e., during recovery). Further, a persistent second level cache in accordance with embodiments may already contain a set of frequently used data pages after a system crash or shutdown. Additionally, since the capacity of a second level cache implemented using solid state drives is greater than a cache implemented in RAM or memory, a large number of database pages can be accessed quicker than if those pages were only stored in disk storage.

Solid State Drive as a Secondary Cache-System

Figure 2:
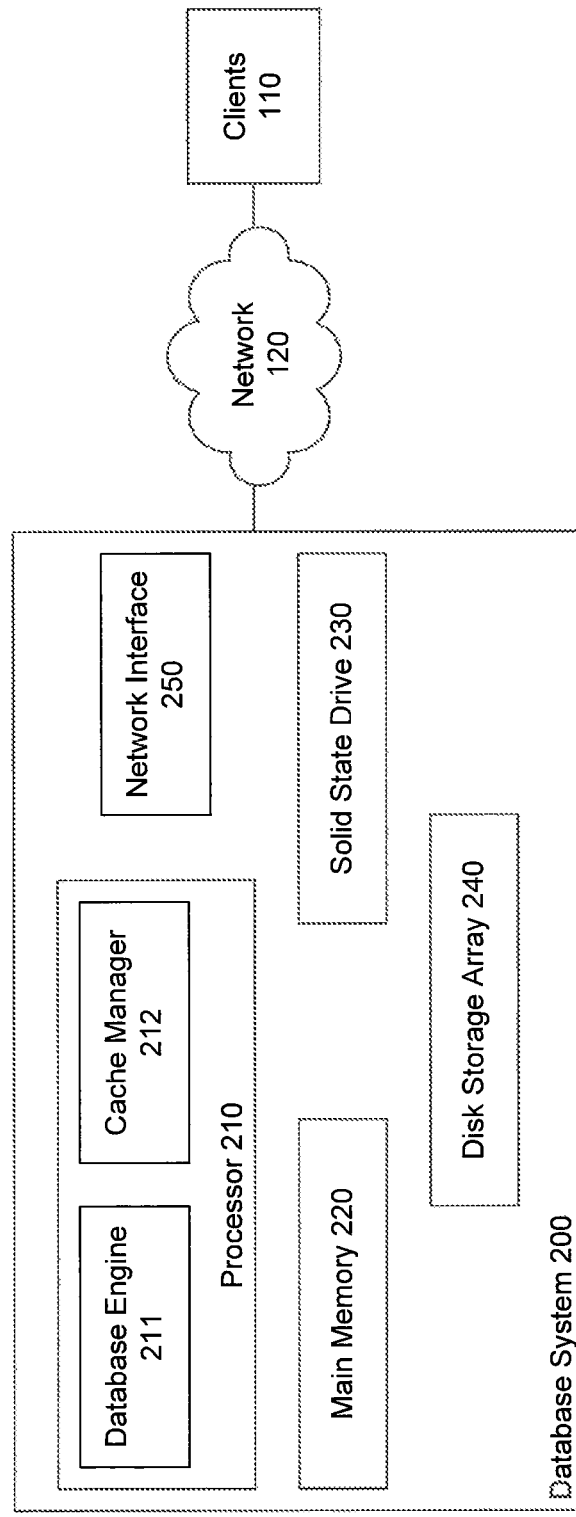
FIG. 2 is a diagram of a database system in accordance with an embodiment.

FIG. 2 is a diagram of a database system 200, in accordance with an embodiment. Database system 200 includes processor 210, main memory 220, solid state drives 230, hard disks 240, and network interface 250.

Processor 210 may be a central processing unit, as would be known to one of ordinary skill in the art. Processor 210 may be, in some embodiments, a general purpose or special purpose processor. Database system 200 may include one or more processors 210, which may operate in parallel. A database engine 211 and a cache manager 212 may be implemented on processor 210. Database engine 211 may receive queries from clients, interpret the queries to determine which data pages in the database satisfy the queries, and provide the results of queries to the requesting client. The operation of cache manager 212 is further described herein.

Main memory 220 of database system 200 may be, in one embodiment, random access memory (RAM). Database system 200 may contain a specific amount of memory 220, as specified by a user or manufacturer of database system 200. A portion of memory 220 may be configured to operate as a first level cache for database system 200. Based on the amount of memory 220 that is used as the first level cache, the first level cache has a set number of page frames that can store data pages frequently used by database system 200. Typical page frame sizes may range from 4 KB to 64 KB or larger.

Database system 200 also includes one or more solid state drives 230. Solid state drives 230 may be configured to operate as a second level cache for database system 200. In some embodiments, multiple solid state drives 230 may operate in a RAID (redundant array of independent disk) array to increase performance and/or reliability. The size or capacity of the second level cache depends on the capacity of the solid state drive(s) 230 used to implement the second level cache. Based on the size of the second level cache, the second level cache has a set number of page frames that can store data pages used by database system 200.

Database system 200 also includes disk storage 240. Disk storage 240 may be composed of one or more hard disk drives. Disk storage 240 may store multiple database pages requested and accessed by one or more clients 201. As described above, disk storage 240 may be composed of multiple hard disk drives configured in a RAID array to increase performance and/or reliability.

Network interface 250 of database system 200 may be, in some embodiments, an Ethernet network interface. Network interface 250 may connect database system 200 to a local area network or wide area network, such as the Internet.

As mentioned above, a cache manager 212 may be implemented on processor 210. Cache manager 212 may be responsible for various cache-related tasks, such as copying a data page from disk to cache, copying a data page evicted from a first level cache to a second level cache, and copying a data page evicted from a second level cache to disk storage.

Methods

Figure 3:
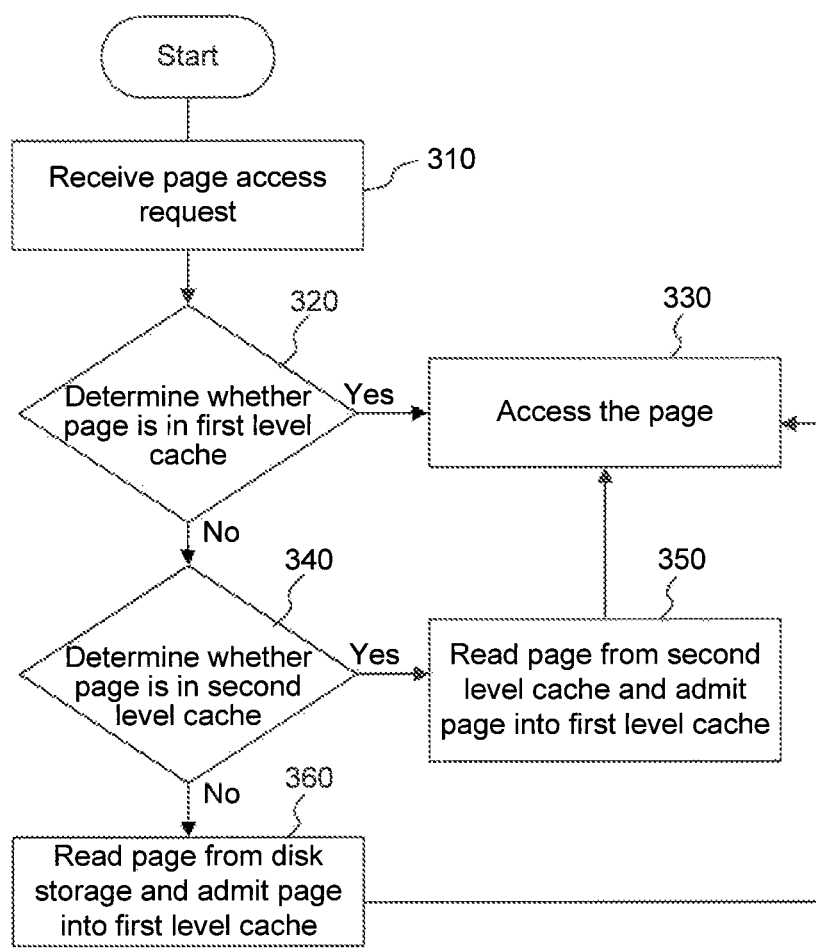
FIG. 3 is a flow diagram of a method of accessing a data page in accordance with an embodiment.

FIG. 3 is a flow diagram of a method 300 of handling a page access request in accordance with an embodiment. While embodiments are described herein as operating with pages, any other object size may be alternatively used. FIG. 3 may be performed, in one embodiment, by database engine 211 or cache manager 212. FIG. 3 begins at step 310, where a page access request is received. The page access request may be received in response to execution of a database query, for example.

At decision block 320, a determination is made as to whether the page is located in a first level cache. As described above, the first level cache may be implemented in main memory of a database system, or RAM. If the page is located in the first level cache, method 300 proceeds to step 330, and the page is accessed. If the page is not located in the first level cache, method 300 proceeds to decision block 340.

At decision block 340, a determination is made as to whether the page is located in the second level cache implemented in the solid state drive(s). In one embodiment, the determination of decision block 340 may be performed using a page directory stored in the second level cache. The page directory includes data related to which pages are stored in the second level cache, and is further described below. If the page is located in the second level cache, method 300 proceeds to step 350, and the page is read from the second level cache. In addition, at step 350, the requested page is admitted into the first level cache. Admitting a page into the first level cache is farther described below with reference to FIG. 4.

If the page is not located in the SSD cache, method 300 proceeds to step 360. At step 360, the page is read from disk storage. Further, the page is admitted into the first level cache.

Figure 4:
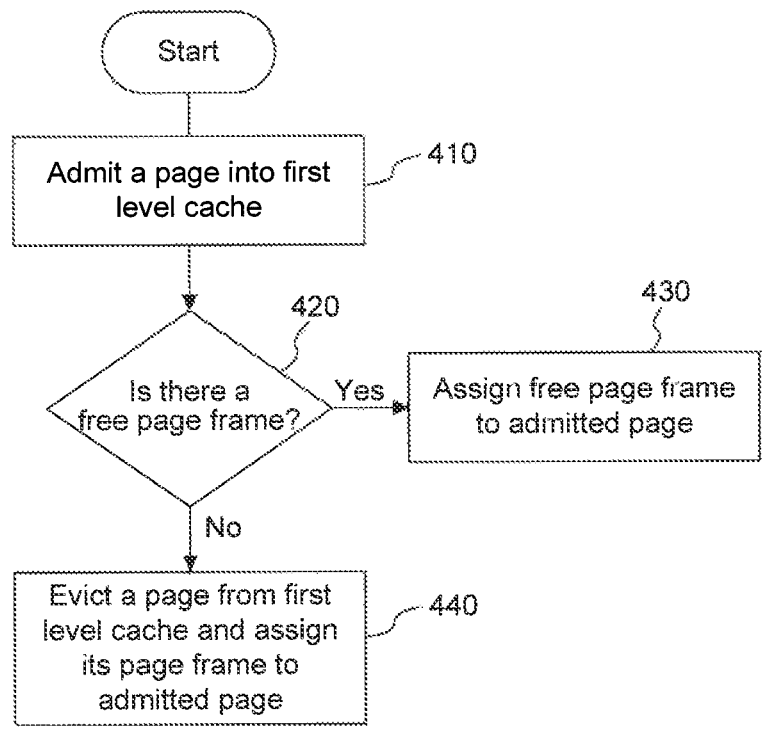
FIG. 4 is a flow diagram of a method of admitting a data page into a cache in accordance with an embodiment.

FIG. 4 is a flow diagram of a method 400 of admitting a page into a first level cache. Method 400 may be implemented by, in one embodiment, cache manager 212. Method 400 begins at step 410, where a cache manager determines that a page should be admitted into the first level cache. The page may be admitted into first level cache if the page is requested and found either in the second level cache or in disk storage, as described above.

At decision block 420, a determination is made as to whether the first level cache has a free page frame for a data page. If the first level cache has a free page frame, the free page frame is assigned to the admitted page at block 430, and the admitted page is copied into the free page frame.

If the first level cache does not have a free page frame, at block 440, a page is evicted from the first level cache, and its page frame is assigned to the admitted page. The admitted page is copied into the page frame of the evicted page. The eviction process is explained in further detail in method 500 of FIG. 5.

Figure 5:
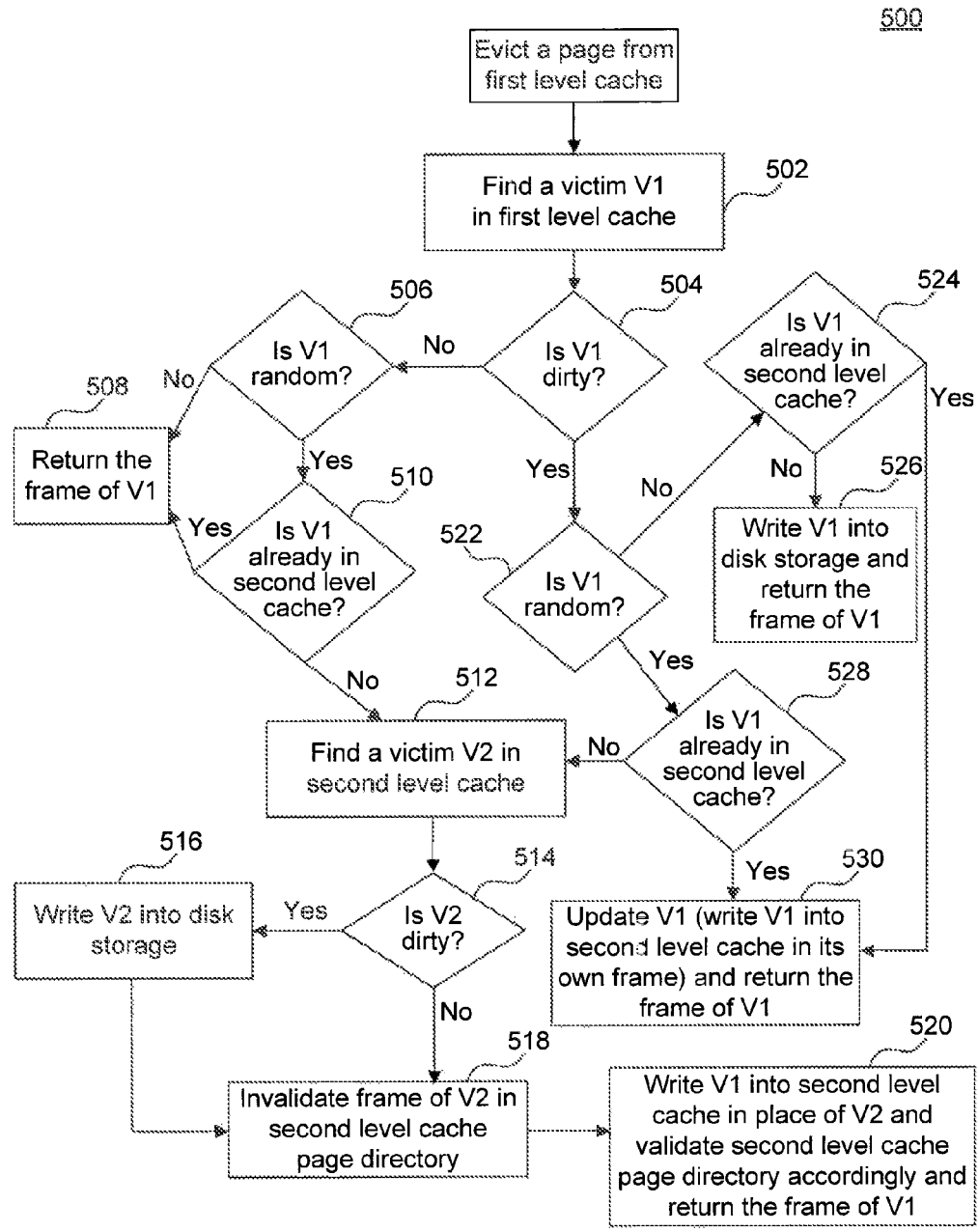
FIG. 5 is a flow diagram of a method of evicting a page from cache in accordance with an embodiment.

FIG. 5 is a flow diagram of a method 500 of evicting a page from the first level cache, in accordance with an embodiment. Method 500 may be implemented by, in one embodiment, cache manager 212. As described above, evicting a page from the first level cache occurs when a data page is to be admitted into the first level cache from either the second level cache or from disk storage. Method 500 may be performed to determine a location or page frame in the first level cache for the admitted page to be copied to. Method 500 begins at step 502, where a victim page, V1, is found in the first level cache. Victim page V1 refers to the data page that will be evicted from the first level cache. In one embodiment, victim page V1 can be identified using a cache replacement policy, for example and without limitation, a "least recently used" cache replacement policy.

At decision block 504, a determination is made as to whether V1 is dirty or clean. If V1 is not dirty (i.e. clean), method 500 proceeds to decision block 506. At decision block 506, V1 is checked to determine whether V1 is from a random read or a sequential read. If V1 is from a sequential read, method 500 proceeds to step 508, where the frame location of V1 is returned. Thus, V1 will be evicted from the first level cache. Since victim page V1 is clean and not modified, the admitted data page can be copied to its page frame, and victim page V1 does not need to be copied to the second level cache or disk storage. Moreover, since victim page V1 is from a sequential read, there may be a lesser performance benefit that results from keeping victim page V1 in a cache than from allowing the page frame of V1 to be occupied by another requested data page.

If V1 is from a random read, method 500 proceeds to decision block 510. At decision block 510, the second level cache (or the page directory of the second level cache) is checked to determine whether a copy of V1 is present in the second level cache. If a copy of V1 is present in the second level cache, method 500 proceeds to step 508, as described above, and the frame location of V1 is returned. If a copy of V1 is not in the second level cache, method 500 proceeds to step 512. Since victim page V1 is clean and not modified, and is already present in the second level cache, the admitted data page can be copied to its page frame in the first level cache. V1 will still be quickly accessible if requested, as it will be present in the second level cache.

At step 512, a second victim page, V2, is identified in the second level cache. In accordance with one embodiment, space must be found in the second level cache to store V1, since V1 is to be evicted from the first level cache. To make space for V1, V2 is evicted from the second level cache. As with victim page V1, in one embodiment, victim page V2 can be identified using a cache replacement policy, for example and without limitation, a "least recently used" cache replacement policy. Once V2 is identified, method 500 proceeds to decision block 514.

At decision block 514, V2 is checked to determine whether it is dirty or clean. If V2 is dirty, method 500 proceeds to step 516. At step 516, V2 is written to disk storage. Writing the dirty page to disk storage ensures that the updated contents of the page are later available. Method 500 then proceeds to step 518, where the page frame of V2 is invalidated in the second level cache page directory.

If V2 is clean, method 500 proceeds directly to step 518, where the page frame of V2 is invalidated in the second level cache page directory.

After step 518, method 500 proceeds to step 520, and V1 is written into the place of V2. At step 520, the page directory of the second level cache is also validated. Thus, the victim from the first level cache, V1, is copied to the second level cache, and the victim from the second level cache, V2, is copied into disk storage. Copying pages in this manner, in accordance with an embodiment, ensures that the recovery process can take place accurately.

If, at decision block 504, V1 is a dirty page, method 500 proceeds to decision block 522. At decision block 522, V1 is checked to determine whether it is from a random read or a sequential read.

If V1 is from a sequential read, method 500 proceeds to decision block 524. At decision block 524, the second level cache is checked to determine whether V1 is already present in the second level cache. If it is not present in the second level cache, V1 is copied into disk storage, and V1's page frame location is returned. If, at decision block 524, V1 is already present in the second level cache, method 500 proceeds to step 530. at step 530, V1 is updated by writing a copy of V1 into its own frame in the second level cache If V1 is from a random read, method 500 proceeds to decision block 528. At decision block 528, the page directory of the second level cache may be used to determine whether V1 is already present in the second level cache. If V1 is already present in the second level cache, at step 530, V1 is updated by writing a copy of V1 into its own frame in the second level cache. If V1 is not present in the second level cache, method 500 proceeds from decision block 528 to block 512, as described above.

Page Directory

Directories are used in database systems to deter-nine which objects (such as but not limited to pages) are stored in a first level or second level cache. In one embodiment, a page directory for the persistent second level cache is stored in the second level cache. The physical location of a page directory affects the operation of the recovery process that occurs when a database system suffers an unintentional shutdown, loss of power, crash, or other such event.

Recovery is typically a very read/write intensive process in which many pages are read from or written to disk storage. In a database system without a persistent second level cache, all reads and writes are performed using disk storage. In accordance with one embodiment, in a database system with a persistent second level cache, many or most of the necessary reads and writes are performed using the second level cache. Thus, for example, if a page exists in the second level cache, a read or write request is sent to the second level cache. Otherwise, the read or write request is sent to the disk storage. Using the persistent second level cache in this way results in a considerable performance improvement, and thus the recovery process may be quicker in a database system with a persistent second level cache. Further, after the recovery process is complete, the second level cache may be warm, eliminating or reducing the ramp-up time of the second level cache.

To benefit from the persistence of the second level cache during recovery, before starting recovery, the location of a data page (i.e., whether the data page is in the second level cache or on disk storage) must be known. Thus, a page directory of the second level cache must be available.

One approach to the page directory problem is to maintain the page directory in memory. However, if the database crashes, then the page directory is lost, unless it has been written somewhere prior to the crash. Upon recovery, the page directory must be reconstructed in memory. One solution for reconstructing the page directory at the beginning of the recovery process is to scan the second level cache and reconstruct the page directory using the metadata of the pages. However, such an operation is costly in terms of time and disk input/output operations, as the entire second level cache must be scanned, and this operation is also subject to the torn page, or partial write, problem. Moreover, storing the page directory in memory reduces the amount of memory that can be used as the first level cache.

Thus, in one embodiment, the page directory is stored on the second level cache. Thus, assuming the solid state drives used to implement the second level cache are durable, reconstructing the page directory is not necessary, as the second level cache is a persistent cache. Storing the page directory on the second level cache requires that every time a page is admitted to the second level cache, the page directory must be updated as well. However, in practice, the impact of these writes has been shown to be minimal. This is due to the fact that the page directory is modified only if a new page is admitted into the second level cache. In a write-intensive workload, in which pages are modified many times, if a working set of a database fits in the space of a second level cache, after the cache is warmed up, the number of evictions from the solid state drive is minimal. Further, because the second level cache is large, the size of the page directory is also correspondingly large. Storing the page directory in the second level cache instead of memory saves capacity in the memory, and allows the faster first level cache to store more pages and improve its hit ratio.

The page directory is an array with a size equal to the number of available page-frames on the second level cache. In the array, a page number of a particular page resides inside each element. When a dirty page gets evicted from RAM, or the first level cache, and is already resident in the second level cache, there is no need to update the page number in the page directory. When the contents of a second level cache-resident frame are updated as a result of admitting a new page into the second level cache, the page directory should be updated accordingly.

Because the page directory is stored in the second level cache, if an eviction from the first level cache results in an eviction from the second level cache, as described above, one method of proceeding is as follows. At step one, a victim must be found in the second level cache. This victim is copied into the disk storage to make a free frame for a victim page from the first level cache at step two. At step three, the victim page from the first level cache is then copied into the second level cache, and the page directory is updated accordingly at step four. However, if a crash occurs during step three of this method, a torn page will exist on the second level cache, and the page directory will be invalid. Thus, a mechanism for detecting the torn pages and resolving recovery issues caused by torn pages would be needed.

To avoid the torn page problem, if an eviction from the first level cache results in an eviction from the second level cache, after the victim page from the second level cache is copied into the disk storage, the page directory is invalidated for that victim page's page frame. The victim page from the first level cache is copied to the now-free frame on the second level cache, and the page directory can be updated and validated for the corresponding page frame. These steps correspond to steps 516, 518, and 520 of method 500 described above.

With the above method, if a crash occurs when the victim page from the second level cache is copied into disk storage, a torn page will exist on the disk storage. However, the torn page does not represent a problem, because a valid version of the page is still located on the second level cache. Similarly, if a crash occurs after the victim page from the second level cache is copied to the disk storage but before the page frame can be invalidated, no issues exist, because the page directory is still consistent with the contents of the second level cache.

If a crash occurs during the process of invalidating the page frame, two possible situations exist. Either the page directory is updated successfully, or the page directory is unmodified. If the page directory is updated successfully, the page directory will contain an invalid frame, and a copy of the page for that frame is already copied into disk storage. If the page directory is unmodified, then the page directory is still consistent with the contents of the second level cache, and so no inconsistency exists. Similarly, if a crash occurs directly after the page flame is successfully invalidated, an invalid frame will exist in the page directory, but a copy of that page is already safely stored in disk storage, and so the database remains consistent.

If a crash occurs when the victim page from the first level cache is copied to the second level cache, the contents of that page frame become torn. However, no inconsistency exists, because the page frame for that page is already marked as invalid, and the crash recovery process will not rely on the contents of the torn page in the second level cache.

Further, if a crash occurs after the victim page from the first level cache is copied to the second level cache, the contents of that page frame will be valid, but the page directory may report that the page frame is not valid. Again, no issue will exist, because there is no inconsistency between the page directory and the contents of the second level cache. Further, the crash recovery process will recover the contents of the page written to the second level cache successfully.

Finally, a crash may occur while the page directory is being validated. However, because changes to the page directory only involve changing an integer value, a partial change is not possible. If the integer value changes successfully, this final step is completed.

Checkpoints

Database systems perform a periodic process known as a checkpoint. During the checkpoint process, all dirty pages (i.e., pages in cache that have been updated since they were last written to disk storage) are written to disk storage. The checkpoint process is performed to establish known good points of the database that can be used as starting points for crash recovery. Two alternatives are possible for the checkpoint process when using a persistent second level cache implemented using solid state drives in accordance with embodiments. In accordance with one embodiment, one alternative is to write all dirty pages from the first level cache into the second level cache. In accordance with a second embodiment, during the checkpoint process, dirty pages in memory are checked to determine whether they are already in the second level cache. If so, then the dirty page is flushed or updated in the second level cache. Thus, dirty pages in the second level cache that already exist in the second level cache are flushed in place. If a dirty page is not in the second level cache, then the page is written to disk storage.

In practice, the second embodiment has been shown to be preferable. For example, assume the second level cache is full, and a dirty page in the first level cache may need to be copied into the second level cache for checkpoint. To do so, a page must be evicted from the second level cache, which requires copying the page to disk storage, making checkpoint expensive. Further, dirty pages that are not present in the second level cache are likely not hot enough (i.e., not accessed frequently enough), so copying those non-hot dirty pages into the disk storage, in accordance with the second alternative, is preferable to crowding the second level cache with those non-hot dirty pages.

In addition, the checkpoint process according to the second alternative is faster for a number of reasons. First, when the second level cache is warm (i.e., after a certain period of time from startup, caches contain the most frequently used data in the database), most dirty pages in memory are also present in the second level cache as well. Thus, at checkpoint, the most writes would be from the first level cache to the second level cache, which is faster than writing to disk storage. Moreover, unlike other caching techniques, at checkpoint time, there is no need to flush dirty pages from the second level cache to the disk storage, and then to flush dirty pages from the first level cache into disk storage.

Computer System

Figure 6:
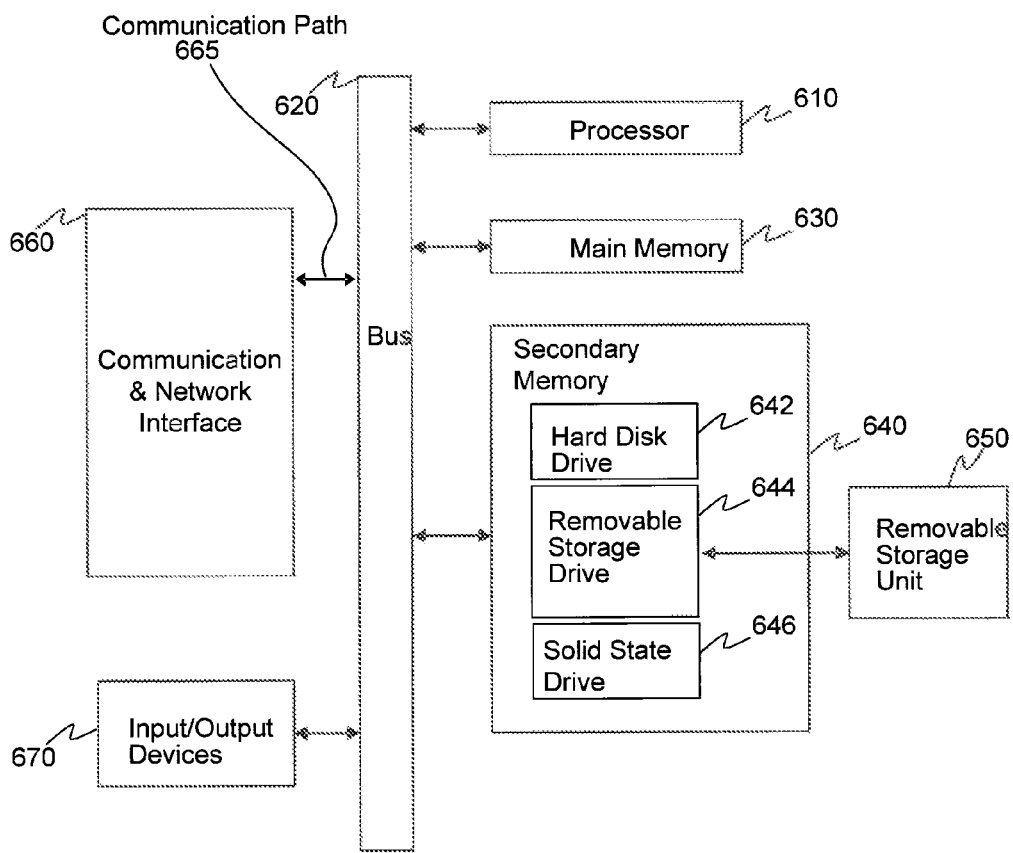
FIG. 6 is an example computer system in which embodiments of the invention can be implemented.

Various aspects of the invention can be implemented by software, firmware, hardware, or a combination thereof. FIG. 6 illustrates an example computer system 600 in which the invention, or portions thereof, can be implemented as computer-readable code. For example, the methods illustrated by flowcharts described herein can be implemented in system 600. Various embodiments of the invention are described in terms of this example computer system 600. For example, database system 200 may be implemented in computer system 600. After reading this description, it will become apparent to a person skilled in the relevant art how to implement the invention using other computer systems and/or computer architectures.

Computer system 600 includes one or more processors, such as processor 610. Processor 610 can be a special purpose or a general purpose processor. Processor 610 is connected to a communication infrastructure 620 (for example, a bus or network).

Computer system 600 also includes a main memory 630, preferably random access memory (RAM), and may also include a secondary memory 640. Secondary memory 640 may include, for example, a hard disk drive 642, a removable storage drive 644, a solid state drive 646, and/or a memory stick. Removable storage drive 644 may comprise a floppy disk drive, a magnetic tape drive, an optical disk drive, a flash memory, or the like. The removable storage drive 644 reads from and/or writes to a removable storage unit 650 in a well-known manner. Removable storage unit 650 may comprise a floppy disk, magnetic tape, optical disk, etc. which is read by and written to by removable storage drive 644. As will be appreciated by persons skilled in the relevant art(s), removable storage unit 650 includes a computer usable storage medium having stored therein computer software and/or data.

In alternative implementations, secondary memory 640 may include other similar means for allowing computer programs or other instructions to be loaded into computer system 600. Such means may include, for example, a removable storage unit 650 and an interface (not shown). Examples of such means may include a program cartridge and cartridge interface (such as that found in video game devices), a removable memory chip (such as an EPROM, or PROM) and associated socket, and other removable storage units 650 and interfaces which allow software and data to be transferred from the removable storage unit 650 to computer system 600.

Computer system 600 may also include a communications and network interface 660. Communications interface 660 allows software and data to be transferred between computer system 600 and external devices. Communications interface 660 may include a network interface, such as a modem, a communications port, a PCMCIA slot and card, or the like. Software and data transferred via communications interface 660 are in the form of signals which may be electronic, electromagnetic, optical, or other signals capable of being received by communications interface 660. These signals are provided to communications interface 660 via a communications path 665. Communications path 665 carries signals and may be implemented using wire or cable, fiber optics, a phone line, a cellular phone link, an RF link or other communications channels.

The network interface 660 allows the computer system 600 to communicate over communication networks or mediums such as LANs, WANs the Internet, etc. The network interface 660 may interface with remote sites or networks via wired or wireless connections.

In this document, the terms "computer program medium" and "computer usable medium" and "computer readable medium" are used to generally refer to media such as removable storage unit 650, removable storage drive 644, and a hard disk installed in hard disk drive 642. Signals carried over communications path 665 can also embody the logic described herein. Computer program medium and computer usable medium can also refer to memories, such as main memory 630 and secondary memory 640, which can be memory semiconductors (e.g. DRAMs, etc.). These computer program products are means for providing software to computer system 600.

Computer programs (also called computer control logic) are stored in main memory 630 and/or secondary memory 640. Computer programs may also be received via communications interface 660. Such computer programs, when executed, enable computer system 600 to implement embodiments of the invention as discussed herein. In particular, the computer programs, when executed, enable processor 610 to implement the processes of the invention, such as the steps in the methods illustrated by flowcharts discussed above. Accordingly, such computer programs represent controllers of the computer system 600. Where the invention is implemented using software, the software may be stored in a computer program product and loaded into computer system 600 using removable storage drive 644, interfaces, hard drive 642 or communications interface 660, for example.

The computer system 600 may also include input/output/display devices 670, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A database system, comprising:
one or more random access memories configured to operate as a first level cache for the database system;
one or more solid state drives configured to operate as a persistent second level cache for the database system;
one or more hard disk drives configured to operate as disk storage for the database system; and
a cache manager, implemented on one or more processors, configured to:
store a page directory in the second level cache;
receive a request for a data page;
determine where the requested data page is stored;
ensure the requested data page is accessible from the first level cache, wherein to ensure comprises evicting a first level cache victim data page stored in the first level cache;
determine whether the first level cache victim data page is from a random read;
in response to determining the first level cache victim data page is from the random read, copy the first level cache victim data page from the first level cache to the second level cache;
update one or more dirty pages stored in the second level cache in place at a checkpoint using the page directory when an image of the one or more dirty pages exists in the second level cache; and
use the page directory of the second level cache during a recovery process.

2. The system of claim 1, wherein the cache manager is further configured to determine the first level cache victim data page from a random read is not present in the second level cache, and copy the first level cache victim data page from the first level cache to the second level cache in response to determining the first level cache victim data page from a random read is not present in the second level cache.

3. The system of claim 1, wherein the cache manager is further configured to update the page directory in the second level cache upon the victim data page being copied from the first level cache to the second level cache.

4. The system of claim 1, wherein the cache manager is further configured to:
determine the request for the data page will result in an eviction from the first level cache and the second level cache;
in response to determining the request for the data page will result in an eviction from the first level cache and second level cache, copy a second level cache victim page from the second level cache to the disk storage;
invalidate a page frame for the second level cache victim page in the page directory;
copy the first level cache victim page from the first level cache to the second level cache; and
validate the page directory.

5. The system of claim 1, wherein the second level cache stores frequently requested data pages.

6. The system of claim 1, wherein the cache manager is configured to copy the requested page from the second level cache to the first level cache, if the requested data page does not exist in the first level cache.

7. The system of claim 1, wherein the cache manager is configured to preserve the contents of the second level cache upon shutdown or failure of the database system.

8. The system of claim 1, wherein the cache manager is further configured to update the contents of the page directory in response to admitting a new page into the second level cache.

9. The system of claim 1, wherein the page directory comprises an array sized to a number of available page-frames of the second level cache, the array storing one or more page numbers corresponding to the page-frames of the second level cache within respective elements of the array.

10. The system of claim 1, wherein the cache manager is further configured to:
determine whether the first level cache victim data page is from a sequential read; and
in response to determining the first level cache victim data page is from the sequential read, return a frame of the first level cache victim data page without copying the first level cache victim data page to the second level cache.

11. A computer-implemented method in a database system, comprising:
storing a page directory in the second level cache of the database system;
receiving a request for a data page;
determining where the requested data page is stored;

ensuring the requested data page is accessible from the first level cache, wherein the ensuring comprises evicting a first level cache victim data page stored in the first level cache;

determining whether the first level cache victim data page is from a random read;

in response to determining the first level cache victim data page is from the random read, copying the first level cache victim data page from the first level cache to the second level cache;

updating one or more dirty pages stored in the second level cache in place at a checkpoint using the page directory when an image of the one or more dirty pages exists in the second level cache; and using the page directory of the second level cache during a recovery process.

12. The method of claim 11, further comprising providing one or more solid state drives configured to operate as a persistent second level cache.

13. The method of claim 11, wherein the copying the first level cache victim data page from the first level cache to the second level cache further comprises updating the page directory in the second level cache.

14. The method of claim 11, further comprising:
determining the request for the data page will result in an eviction from the first level cache and the second level cache;
copying a second level cache victim page from the second level cache to the disk storage;
invalidating a page frame for the second level cache victim page in the page directory;
copying the first level cache victim page from the first level cache to the second level cache; and
validating the page directory.

15. The method of claim 11, further comprising copying the requested data page from the second level cache to the first level cache if the requested data page does not exist in the first level cache.

16. A non-transitory computer readable storage medium having instructions stored thereon that, when executed by a processor, cause the processor to perform operations comprising:

storing a page directory in the second level cache of the database system,
receiving a request for a data page;
determining where the requested data page is stored;
ensuring the requested data page is accessible from the first level cache, wherein to ensure comprises evicting a first level cache victim data page stored in the first level cache;
determining whether the first level cache victim data page is from a random read;
in response to determining the first level cache victim data page is from the random read, copying the first level cache victim data page from the first level cache to the second level cache;
updating one or more dirty pages stored in the second level cache in place at a checkpoint using the page directory when an image of the one or more dirty pages exists in the second level cache; and
using the page directory of the second level cache during a recovery process.

17. The non-transitory computer readable storage medium of claim 16, the operations further comprising providing one or more solid state drives configured to operate as a persistent second level cache.

18. The non-transitory computer readable storage medium of claim 16, wherein the operation of copying the evicted data page from the first level cache to the second level cache further comprises updating the page directory in the second level cache.

19. The non-transitory computer readable storage medium of claim 16, the operations further comprising:
determining the request for the data page will result in an eviction from the first level cache and the second level cache;
copying a second level cache victim page from the second level cache to the disk storage;
invalidating a page frame for the second level cache victim page in the page directory;
copying the first level cache victim page from the first level cache to the second level cache; and
validating the page directory.

* * * * *